US00RE40804E

(19) United States
(12) Reissued Patent
Heiner

(10) Patent Number: US RE40,804 E
(45) Date of Reissued Patent: Jun. 23, 2009

(54) FILTER-IN METHOD FOR REDUCING JUNK E-MAIL

(75) Inventor: Jeffrey Nelson Heiner, Franklin Park, NJ (US)

(73) Assignee: AOL LLC, Dulles, VA (US)

(21) Appl. No.: 11/448,580

(22) Filed: Jun. 7, 2006

Related U.S. Patent Documents

Reissue of:
(64) Patent No.: 6,112,227
Issued: Aug. 29, 2000
Appl. No.: 09/129,777
Filed: Aug. 6, 1998

(51) Int. Cl.
*G06F 15/16* (2006.01)

(52) U.S. Cl. ..... 709/203; 709/206; 709/205; 709/204; 709/202

(58) Field of Classification Search ..... 709/203, 709/202, 204, 205, 206; 370/352, 401, 353
See application file for complete search history.

(56) References Cited

U.S. PATENT DOCUMENTS

| | | | |
|---|---|---|---|
| 4,977,520 | A | 12/1990 | McGaughey, III et al. |
| 5,040,141 | A | 8/1991 | Yazima et al. |
| 5,093,918 | A | 3/1992 | Heyen et al. |

(Continued)

FOREIGN PATENT DOCUMENTS

| | | |
|---|---|---|
| DE | 19708856 | 9/1998 |
| EP | 0463252 | 1/1992 |
| EP | 0686327 | 2/1995 |
| EP | 0651533 | 5/1995 |
| EP | 0721268 | 7/1996 |
| EP | 0725523 | 8/1996 |
| EP | 0760565 | 7/1998 |
| EP | 0883271 | 12/1998 |
| WO | 94/06236 | 3/1994 |
| WO | 96/09714 | 3/1996 |
| WO | 96/24213 | 8/1996 |
| WO | 97/14234 | 4/1997 |
| WO | 97/20423 | 6/1997 |
| WO | 97/23082 | 6/1997 |
| WO | 97/24825 | 7/1997 |
| WO | 97/26709 | 7/1997 |
| WO | 98/37675 | 8/1998 |
| WO | 99/10817 | 3/1999 |
| WO | 01/16695 | 3/2001 |
| WO | 02/077768 | 10/2002 |
| WO | 03/044617 | 5/2003 |

OTHER PUBLICATIONS

Andrew Leonard, SpamBomers, Sep. 1997, 7 pages, Salon Magazine + about 21st + newsletter.
Cementing Online Partnerships and Improving User Experience, RSA Security, retrived online May 17, 2006, 7 pages, www.rsasecurity.com.
Chinese Abstract for CN 1117680, published Feb. 28, 1996.
CNET News.com staff, ISP: Internet Spam Provider, Feb. 18, 1997, 2 pages, CNET News.com.

(Continued)

*Primary Examiner*—Edan Orgad
*Assistant Examiner*—Ho Chuong
(74) *Attorney, Agent, or Firm*—Workman Nydegger

(57) ABSTRACT

A method is provided for preventing the delivery of unwanted electronic mail messages to a destination client. An original electronic mail message is first received from a source client at a destination server. Next, a reply electronic mail message is sent from the destination server to the source client requesting the source client to complete a registration process to register the source client's electronic mail address with the destination server. The original electronic mail message is only sent from the destination server to the destination client when the source client properly registers the source client's electronic mail address.

42 Claims, 2 Drawing Sheets

U.S. PATENT DOCUMENTS

| | | | | | |
|---|---|---|---|---|---|
| 5,159,673 | A | | 10/1992 | Sackmann et al. | |
| 5,204,961 | A | | 4/1993 | Barlow | |
| 5,245,532 | A | | 9/1993 | Mourier | |
| 5,283,856 | A | | 2/1994 | Gross et al. | |
| 5,319,776 | A | | 6/1994 | Hile et al. | |
| 5,333,266 | A | | 7/1994 | Boaz et al. | |
| 5,377,354 | A | | 12/1994 | Scannell et al. | |
| 5,423,042 | A | | 6/1995 | Jalili et al. | |
| 5,448,734 | A | | 9/1995 | Hrabik et al. | |
| 5,471,519 | A | | 11/1995 | Howe et al. | |
| 5,473,671 | A | | 12/1995 | Partridge, III | |
| 5,539,828 | A | | 7/1996 | Davis | |
| 5,548,789 | A | | 8/1996 | Nakanura | |
| 5,600,799 | A | | 2/1997 | Young et al. | |
| 5,604,803 | A | | 2/1997 | Aziz | |
| 5,608,786 | A | | 3/1997 | Gordon | |
| 5,619,648 | A | * | 4/1997 | Canale et al. | 709/206 |
| 5,627,764 | A | | 5/1997 | Schutzman et al. | |
| 5,630,123 | A | | 5/1997 | Hogge | |
| 5,632,018 | A | | 5/1997 | Otorii | |
| 5,655,079 | A | | 8/1997 | Hirasawa et al. | |
| 5,721,779 | A | | 2/1998 | Funk | |
| 5,734,903 | A | | 3/1998 | Saulpaugh et al. | |
| 5,742,668 | A | | 4/1998 | Pepe et al. | |
| 5,742,769 | A | | 4/1998 | Lee et al. | |
| 5,781,857 | A | | 7/1998 | Hwang et al. | |
| 5,796,840 | A | | 8/1998 | Davis | |
| 5,826,022 | A | * | 10/1998 | Nielsen | 709/206 |
| 5,832,227 | A | | 11/1998 | Anderson et al. | |
| 5,835,722 | A | | 11/1998 | Bradshaw et al. | |
| 5,859,967 | A | | 1/1999 | Kaufeld et al. | |
| 5,884,033 | A | | 3/1999 | Duvall et al. | |
| 5,893,911 | A | | 4/1999 | Piskiel et al. | |
| 5,909,589 | A | | 6/1999 | Parker et al. | |
| 5,917,489 | A | | 6/1999 | Thurlow et al. | |
| 5,930,479 | A | * | 7/1999 | Hall | 709/238 |
| 5,937,162 | A | | 8/1999 | Funk et al. | |
| 5,999,600 | A | | 12/1999 | Shin | |
| 5,999,932 | A | | 12/1999 | Paul | |
| 5,999,967 | A | | 12/1999 | Sundsted | |
| 6,014,634 | A | | 1/2000 | Scroggie et al. | |
| 6,023,723 | A | * | 2/2000 | McCormick et al. | 709/206 |
| 6,052,709 | A | * | 4/2000 | Paul | 709/202 |
| 6,055,510 | A | | 4/2000 | Henrick et al. | |
| 6,057,841 | A | | 5/2000 | Thurlow et al. | |
| 6,092,101 | A | | 7/2000 | Birrell et al. | |
| 6,154,765 | A | | 11/2000 | Hart | |
| 6,173,322 | B1 | | 1/2001 | Hu | |
| 6,182,118 | B1 | | 1/2001 | Finney et al. | |
| 6,189,026 | B1 | | 2/2001 | Birrell et al. | |
| 6,195,698 | B1 | | 2/2001 | Lillibridge et al. | |
| 6,199,102 | B1 | | 3/2001 | Cobb | |
| 6,199,106 | B1 | | 3/2001 | Shaw et al. | |
| 6,205,432 | B1 | | 3/2001 | Gabbard et al. | |
| 6,237,027 | B1 | | 5/2001 | Namekawa | |
| 6,373,950 | B1 | | 4/2002 | Rowney | |
| 6,393,465 | B2 | | 5/2002 | Leeds | |
| 6,421,709 | B1 | | 7/2002 | McCormick et al. | |
| 6,484,197 | B1 | | 11/2002 | Donohue | |
| 6,546,416 | B1 | * | 4/2003 | Kirsch | 709/206 |
| 6,625,257 | B1 | | 9/2003 | Asaoka et al. | |
| 6,678,704 | B1 | | 1/2004 | Bridge, Jr. et al. | |
| 6,883,095 | B2 | | 4/2005 | Sandhu et al. | |
| 7,194,515 | B2 | * | 3/2007 | Kirsch | 709/206 |
| 7,383,433 | B2 | | 6/2008 | Yeager et al. | |
| 2002/0199095 | A1 | | 12/2002 | Babdini et al. | |
| 2005/0081059 | A1 | | 4/2005 | Bandini et al. | |

OTHER PUBLICATIONS

Cole–Gomolski, Barb, Adoption of S/Mime Still lagging, May 11, 1998, 4 pages, http://www.computerworld.com/home/features.nsf/.

Controlling E–Mail Spam, online, retrieved on Mar. 28, 2003, 5 pages, retrieved from the Internet http://spam.abuse.net/adminhelp/mail.shtml.

Cynthia Dwork, Fighting Spam May be Easier Than You Think, 1992, 30 pages, presentation given in Crypto.

Cynthia Dwork, Fighting Spam: The Science, 2004, pp. 3–4, M. Farach–Colton (Ed.): Latin 2004, LNCS 2976, Springer–Verlag Berlin.

David A. Wheeler, Countering Spam with Ham–Authenicated Email and the Guarded Email Protocol, Draft: First version Dec. 8, 2002; Released Apr. 2, 2003, 28 pages, dwheeler@dwheeler.com.

Douglas G. Henke, All Hail Emperor Lewis ?, online, Feb. 20, 1997, 2 pages, retrived Apr. 25, 2003, retrived from the internet http://groups.google.com/groups.

Ed Foster, The Gripe Line Threatening legal action may be the quickeest way off a junk e–mailer's list, Info World Info Quote, Sep. 9, 1996, 2 pages, vol. 18, Issue 37, http://www.infoworld.com/egi–bin/siplayArchives.pl?.

Janet Kornblum, Programmer Writes Spam Bomb, Aug. 6, 1997, 2 pages, CNET News.com.

Julian Byrne, New Improved EZSPAM! Was: My Spamblock. . ., online, Jan. 28, 1997, 4 pages, retrieved Apr. 25, 2003, retrived from the internet, http://groups.google.com/groups.

Mihir Bellare et al., Does Parallel Repition Lower the Error in Computationally Sound Protocols?, 24 pages, Proceedings of the 38th Symposium on Foundations of Computer Science, IEEE.

MIT LCS, Applied Security Reading Group, by Email Sit and Kevin Fu, 2 pages, updated May 5, 2003 on the Internet http://www.pdocs.lcs,mit.edu/asrg.

Public Access Networks Corporation, Responding to Unsolicited Commercial Email (UCE, "email spam"), Feb. 25, 1997, 5 pages, http:www.panix.com/uce.html.

Showing Full Headers of a Message, Nov. 6, 1998, 3 pages, http:/www.panix.com/headers.html.

The Penny Black Project, online, retrieved on May 8, 2006, 2 pages, retrieved from the Internet http://research.microsoft.com/research/sv/PennyBlack.

Tim Richardson, Simple Notes on Internet Security and Email, Jun. 28, 1999, 2 pages, http://www.timirichardson.net/security.html.

P. Resnick, RFC28822, Apr. 2001, 51 Pages, Qualcom Incorporated, http:rfc.net/rfc2822.html.

D. J. Berstein, Variable Envelope Return Paths, Feb. 1, 1997, 2 pages, http://cr.yp.to/proto/verp.txt.

NAGS Spam Filter [online], Oct. 30, 1997. Retrieved from the Internet http://www.nags.org/spamfilter.html (11 pages).

Document entitled "IMAP/POP Authorize Extension for Simple Challenge/Response, " dated Sep. 1997, by J. Klensin, R. Catoe, P. Krumviede (5 pages).

Unsolicited Bulk Email: Mechanisms for Control, by Paul Hoffman and Dave Crocker, Internet Mail Consortium Report UBE–SOL, IMCR–008, revised May 4, 1998 (16 pages).

Unsolicited Bulk Email: Mechanisms for Control, by Paul Hoffman and Dave Crocker, Internet Mail Consortium Report UBE–SOL, IMCR–005, Oct. 13, 1997 (31 pages).

AOL Fights to Ban Junk Email, by Rose Aguilar [online] [retrieved on Nov. 3, 1998]. Retrieved from the Internet http://www.news.com/News/Item/0.4.3106.00.htm (3 pages).
Foiling Spam with an Email Password System [online]retrieved on Jun. 28, 2004 . Retrieved from the Internet http://www.uwasa.fi/~ts/info/spamfoil.html (10 pages).
Article entitled "Spam!, " by Lorrie Faith Cranor and Brian A. LaMacchia, Aug. 1998, Communications of the ACM, vol. 41, No. 8, pp. 74–83.
How to make SURE a human is sending you mail (was Re: Random e–mails) [online]. Retrieved from the Internet http://groups.google.com/group/news.admini.net–abuse.usenet/msg/e601783e8f40c545?d. . . (2 pages).
Article entitled "Verification of a Human in the Loop or Identification Via the Turing Test, " dated Sep. 13, 1996, by Moni Naor, Department of Applied Mathematics and Computer Science, Weizmann Institute of Science (6 pages).
Article entitled "Pricing Via Processing or Combatting Junk Mail," by Cynthia Dwork and Moni Naor, IBM Research Division and Department of Applied Mathematics and Computer Science, Weizmann Institute of Science (12 pages).
A Way to Stop Spam Messages [online] [retrieved on Apr. 25, 2003]. Retrieved from the Internet http://groups.google.com/groups?q=%B%22sender%22=2Bspam&start=10&hl=en&lr . . . (4 pages).
My Spamblock; Was: Thwarting UCE address culling programs [online] [retrieved on Apr. 28, 2003]. Retrieved from the Internet http://www.google.com/groups?hl=en&lr=lie=UTF–8&oe=UTF–8selm=32E1A4FD.41C. . . (2 pages).
MailCircuits's Email HandShake Verification and Spam Filter Process [online] copyright 1996–2003,MailCircuit.com. Retrieved from the Internet http://www.mailcircuit.com/filter.htm ( 2 pages).
To Mung or Not to Mung, Ronald F. Guilmette, Dated Jul. 24, 1997 [online] [retrieved on Apr. 25, 2003]. Retrieved from the Internet http://groups.google.com/groups?q=The-Deadbolt=tm=%2Bspam&hl=en&lr=&ie=UTF–8. . . (2 pages).
Filter for mail not addressed to you, by Bob Jameson, Dated Aug. 19, 1997 [online] [retrieved on Nov. 3, 1998]. Retrieved from the internet http://www/zdnet.com/anchordesk/talkback/talkback_35298.html (1 page).
Stop Junk E–mail [online] [retrieved on Nov. 4, 1998]. Retrieved from the Internet http://www.crl.com/~michaelp/stopjunkmail.html (1 page).
Dealing with Unsolicited Commercial Email (UCE, "email spam") Copyright 2003, 2005 Public Access Network Corporation [online] [retrieved on Jun. 6, 2006]. Retrieved from the Internet http://www.panix.com.com/uce.html (3 pages).

* cited by examiner

FILTER-IN METHOD FOR REDUCING JUNK E-MAIL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to methods used to reduce the amount of unwanted electronic mail (e-mail) received by a user of an e-mail service.

2. Related Art

The problem of unwanted, i.e. "junk," e-mail is well known and has received considerable attention. However, some background is thought to be of help in understanding the problem and the solutions that have been previously used or proposed, as well as the basic e-mail process. Referring to FIG. 1, there is shown the conventional process of sending e-mail messages from a source client 10 to a destination client 40. After the source client 10 composes an e-mail message, the message is sent from the source client 10 to a source simple mail transfer protocol (SMTP) server 20. The source SMTP server 20 sends the e-mail message to a destination SMTP server 30, which then sends the e-mail message to the destination client 40. A major drawback in the conventional process is the ever increasing amount of junk e-mail messages received by the destination clients 40. Such junk e-mail messages include advertisements for numerous goods and services. Users of e-mail systems have been spending an increasing amount of time separating their regular e-mail messages from unwanted e-mail messages.

Attempts have been made to reduce the number of junk e-mail messages received by the destination clients. Some methods require the source client to add descriptive information to the e-mail message so that the destination SMTP server can prevent undesired e-mail messages from being sent to the destination client. These methods are basically ineffective because the senders of junk e-mail messages will not add the descriptive information which will allow destination clients to block the junk e-mail messages.

Filter-out methods have also been developed. With such filter-out methods, a database of known sources (source clients) of junk e-mail messages is compiled. The destination SMTP server compares the source client's e-mail address to the e-mail addresses in the database and does not sent undesired e-mail messages to the destination client. These methods have also proven to be ineffective because the development of robotic delivery programs. These robotic delivery programs sent out thousands of junk e-mail messages and create nonexistent source client e-mail addresses. Thus, when one source client e-mail address is blocked, a new address is created. As a consequence, the database of known sources of junk e-mail messages can not keep up with changing e-mail addresses created by the robotic delivery programs.

SUMMARY OF THE INVENTION

According to the invention, a method for preventing delivery of unwanted electronic mail is provided which overcomes the problems of prior art methods discussed above. The method of the invention thwarts conventional robotic delivery programs and, in preferred implementations, includes features which will counteract the anticipated use of more sophisticated robotic delivery systems.

In accordance with a first preferred embodiment of the invention, a method for preventing the delivery of unwanted electronic mail messages to a destination client is provided which comprises the steps of: receiving an original electronic mail message from a source client at a destination server; sending a reply electronic mail message from the destination server to the source client requesting that the source client complete a registration process; monitoring the response of the source client to the request to complete a registration process to determine whether the source client properly responds to the request; and sending the original electronic mail message from the destination server to the destination client only if the source client properly responds to the request to complete a registration process.

In another preferred embodiment, a method for preventing the delivery of unwanted electronic mail messages to a destination client is provided which comprises the steps of: receiving an original electronic mail message addressed to a destination client from a source client having an electronic mail address at a destination server; comparing the electronic mail address of the source client to an accept list of electronic mail addresses; sending the original electronic mail message to the destination client when the electronic mail address of the source client is on the accept list; sending a reply electronic mail message from the destination server to the source client requesting that the source client complete a registration process when the electronic mail address of the source client is not on the accept list; monitoring the response of the source client to the request to complete a registration process to determine whether the source client properly responds to the request; and sending the original electronic mail message from the destination server to the destination client only if the source client properly responds to the request to complete a registration process.

In accordance with yet another preferred embodiment of the invention, a method for preventing the delivery of unwanted electronic mail messages to a destination client is provided which comprises the steps of: receiving an original electronic mail message addressed to a destination client from a source client having an electronic mail address at a destination server; comparing the electronic mail address of the source client to an accept list of electronic mail addresses; sending the original electronic mail message to the destination client when the electronic mail address of the source client is on the accept list; comparing the electronic mail address of the source client to a reject list of electronic mail addresses when the electronic address of the source client is not on the accept list; deleting the original message when the electronic mail address of the source client is on the reject list; sending a reply electronic mail message from the destination server to the source client requesting that the source client complete a registration process when the electronic mail address of the source client is not on the reject list; monitoring the response of the source client to the request to complete a registration process to determine whether the source client properly responses to the request; and sending the original electronic mail message from the destination server to the destination client only if the source client properly responds to the request to complete a registration process.

Preferred implementations for the registration process include: answering a question included in the reply electronic mail message; completing a form at an Internet address; and following instructions via a telephone system.

Other features and advantages of the invention will be set forth in, or apparent from, the following detailed description of the preferred embodiments of the invention.

DESCRIPTION OF THE PREFERRED EMBODIMENTS

Figure 1:
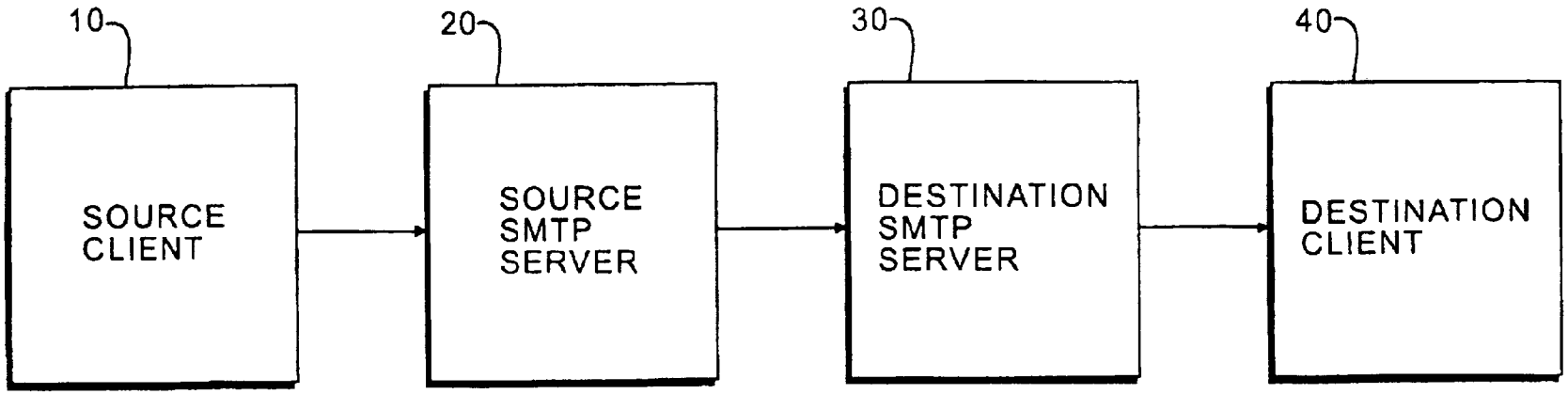
FIG. 1 (PRIOR ART)
FIG. 1, which was discussed above, is a schematic block diagram of a conventional e-mail system.
Figure 2:
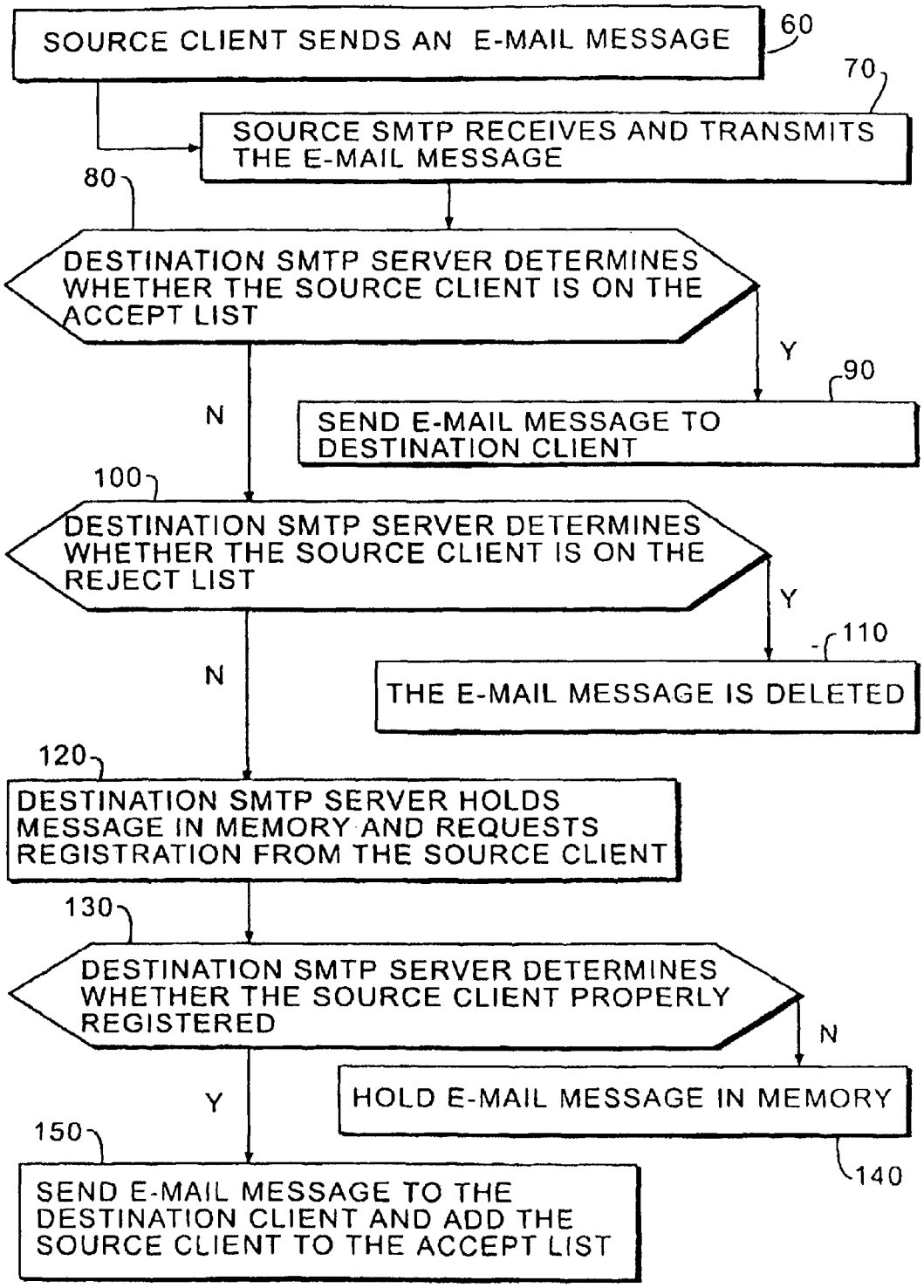
FIG. 2 is a flow chart illustrating a method of blocking junk e-mail messages in accordance with a preferred embodiment of the invention.

Referring to FIG. 2, there are shown the basic steps in a method of reducing the amount of junk e-mail received by a user of an e-mail service in accordance with a preferred embodiment of the invention. In a first step 60, a source client composes an e-mail message and the message is sent to the source SMTP server. Then, in step 70, the source SMTP server sends the e-mail message to the destination SMTP server. In step 80, the destination SMTP server compares the source client's e-mail address to an accept list. The accept list contains the e-mail addresses of source clients from which the destination client wishes to receive e-mail messages. In one implementation, the accept list is automatically updated to include the e-mail addresses of clients to which the destination client has sent e-mail messages. In all implementations, if the source client's e-mail address is on the accept list, the destination SMTP server sends the e-mail message to the destination client, as indicated in step 90. In step 100, if the source client's e-mail address is not on the accept list, the destination SMTP server determines if the source client's e-mail address is on a reject list. The reject list may contain e-mail addresses of known sources of junk e-mail and any e-mail address from which the destination client wishes not to accept e-mail. If the source client's e-mail address is on the reject list, the e-mail message is deleted by the destination SMTP server, as indicated in step 110. In an alternative embodiment, the e-mail message is held in a memory which is accessible by the destination client when the source client's e-mail address is on the reject list.

If the source client is not on the reject list, the destination SMTP server holds the e-mail message in memory and requests that the source client proceed with a registration process, as indicated in step 120. There are many different ways in which the source client can register its e-mail address. In one advantageous implementation, the destination SMTP server sends a reply message to the source client and requests that the source client send back a reply message. When the destination SMTP server receives the reply message, the original e-mail message is "filtered-in" and released to the destination client. However, if the original message is junk e-mail produced by a robotic delivery program, the destination SMTP server will never receive a response to its reply message because the source client e-mail address does not exist.

As robotic delivery programs become more sophisticated, it will become necessary to make the registration process more complex. For example, the destination SMTP server can send a reply message to the source client with instructions or a question that only a human can follow or answer, respectively. The registration process is successfully completed when the source client responds correctly. In a preferred implementation, each destination client is allowed to compose their own question and answer or instructions, in order to maximize the amount of effort required by a source of junk e-mail to send messages to multiple destination clients. In general, it will be cost prohibitive for the source of junk e-mail messages to go through and response to each destination SMTP server reply message. In other embodiments, the registration process is completed by filling out an Internet web page form or by following instructions via a telephone system. Although these embodiments have particular benefit, those skilled in the art will appreciate that there are many different ways in which the registration process can be performed. One advantage of including such a registration process is that it requires the source client to make an effort to filter-in a desired message, instead of requiring the destination client to filter-out undesired messages.

In step 130, the destination SMTP server determines whether the source client properly registered its e-mail address within a predetermined time period. The length of the predetermined time period may be selected either by the destination client or the destination SMTP server. If the e-mail address is properly registered, the original e-mail message is sent to the destination client and the source client's e-mail address is added to the accept list, as indicated in step 150. At any time, the destination client can add e-mail addresses and remove e-mail addresses from the accept and reject lists. Therefore, if the source client does properly register its e-mail address and the destination client wishes to not receive any more e-mail messages from that source client, the destination client can remove that entry from the accept list and add it to the reject list.

In the illustrated embodiment, if the registration process is not successfully completed within the predetermined period of time, the destination SMTP server holds the original e-mail message in a memory, as indicated in step 140. The destination client may access the e-mail messages stored in the memory. The destination SMTP server may delete the e-mail messages from the memory when a preselected event occurs, i.e., when instructed to do so by the destination client, or when a predetermined time period has lapsed, or when the memory is full or when a predetermined number of e-mail messages has been exceeded. Either the destination SMTP server, or the destination client can determine the manner in which the e-mail messages will be deleted from the memory.

In another embodiment (not shown), the destination SMTP server automatically deletes the original e-mail message if the registration process is not completed within the predetermined period of time.

One of ordinary skill in the art will appreciate that the software necessary to carry out the present invention may operate either from the destination server or the destination client.

Although the invention has been described in detail with respect to preferred embodiments thereof, it will be apparent to those skilled in the art that variations and modifications can be effected in these embodiments without departing from the spirit and scope of the invention.

I claim:

1. A method for preventing the delivery of unwanted electronic mail messages to a destination client, said method comprising the steps of:

receiving an original electronic mail message from a source client at a destination server, *said original electronic mail message including an email address for said source client;*

*comparing said electronic mail address of said source client to at least one of an accept list or a reject list of electronic mail addresses;*

*holding said original electronic mail message in a first memory that is distinct from a second memory where*

*deleted messages are stored if said electronic mail address of said source client is not on at least one of said accept list or said reject list*;

sending a reply electronic mail message from said destination server to said source client requesting that said source client complete a registration process*, if said electronic mail address of said source client is not on at least one of said accept list or said reject list,*

*wherein said registration process comprises completing a form at an Internet address, and*

*wherein said form includes a query that is designed to be answered by a human rather than a machine*;

monitoring [the] *a* response of said source client to said request to complete a registration process to determine whether said source client properly responds to said request; and sending said original electronic mail message from said destination server to said destination client only if said source client properly responds to said request to complete a registration process.

2. The method for preventing the delivery of unwanted electronic mail messages according to claim 1, wherein said registration process comprises answering a question included in said reply electronic mail message.

[3. The method for preventing the delivery of unwanted electronic mail messages according to claim 1, wherein said registration process comprises completing a form at an Internet address.]

4. The method for preventing the delivery of unwanted electronic mail messages according to claim 1, wherein said registration process comprises following instructions via a telephone system.

[5. A method for preventing the delivery of unwanted electronic mail messages to a destination client comprising the steps of:

receiving an original electronic mail message addressed to a destination client from a source client having an electronic mail address at a destination server;

comparing said electronic mail address of said source client to an accept list of electronic mail addresses;

sending said original electronic mail message to said destination client when said electronic mail address of said source client is on said accept list;

sending a reply electronic mail message from said destination server to said source client requesting that said source client complete a registration process when said electronic mail address of said source client is not on said accept list;

monitoring the response of said source client to said request to complete a registration process to determine whether said source client properly responds to said request; and sending said original electronic mail message from said destination server to said destination client only if said source client properly responds to said request to complete a registration process.]

[6. The method for preventing the delivery of unwanted electronic mail messages according to claim 5, wherein said registration process comprises answering a question included in said reply electronic mail message.]

[7. The method for preventing the delivery of unwanted electronic mail messages according to claim 5, wherein said registration process comprises completing a form at an Internet address.]

[8. The method for preventing the delivery of unwanted electronic mail messages according to claim 5, wherein said registration process comprises following instructions via a telephone system.]

[9. The method for preventing the delivery of unwanted electronic mail messages according to claim 5, further including the steps of:

storing electronic mail addresses of clients to which said destination client has sent electronic mail messages; and automatically updating said accept list to include said electronic mail addresses of clients to which said destination client has sent electronic mail messages.]

[10. The method for preventing the delivery of unwanted electronic mail messages according to claim 5, further including the steps of:

holding said original electronic mail message in a memory if said source client does not properly respond to said request to complete a registration process;

allowing said destination client to access said memory to determine the content of said original electronic mail message.]

[11. The method for preventing the delivery of unwanted electronic mail messages according to claim 5, further including the step of:

automatically adding said electronic mail address of said source client to said accept list if said source client properly responds to said request to complete a registration process.]

12. A method for preventing the delivery of unwanted electronic mail messages to a destination client comprising the steps of:

receiving an original electronic mail message addressed to a destination client from a source client having an electronic mail address at a destination server;

comparing said electronic mail address of said source client to an accept list of electronic mail addressees;

sending said original electronic mail message to said destination client when said electronic mail address of said source client is on said accept list;

comparing said electronic mail address of said source client to a reject list of electronic mail addresses when said electronic address of said source client is not on said accept list;

deleting said original message when said electronic mail address of said source client is on said reject list;

*holding said original electronic mail message in a first memory that is distinct from a second memory where deleted messages are stored if said electronic mail address of said source client is not on said accept list or said reject list;* sending a reply electronic mail message from said destination server to said source client requesting that said source client complete a registration process when said electronic mail address of said source client is not on said *accept list or said* reject list;

*said registration process includes a query that is designed to be answered by a human rather than a machine;* monitoring the response of said source client to said request to complete a registration process to determine whether said source client properly responds to said request; [and]

sending said original electronic mail message from said destination server to said destination client only if said source client properly responds to said request to complete a registration process*; and*

*deleting said original electronic mail message from said first memory when a predetermined period of time has lapsed without receiving a response to said request that said source client completed a registration process.*

13. The method for preventing the delivery of unwanted electronic mail messages according to claim 12, wherein said registration process comprises answering a question included in said reply electronic mail message.

14. The method for preventing the delivery of unwanted electronic mail messages according to claim 12, wherein said registration process comprises completing a form at an Internet address.

15. The method for preventing the delivery of unwanted electronic mail messages according to claim 12, wherein said registration process comprises following instructions via a telephone system.

16. The method for preventing the delivery of unwanted electronic mail messages according to claim 12, further including the steps of:

storing electronic mail addresses of clients to which said destination client has sent electronic mail messages; and automatically updating said accept list to include said electronic mail addresses of clients to which said destination client has sent electronic mail messages.

17. The method for preventing the delivery of unwanted electronic mail messages according to claim 12, further including the steps of:

holding said original electronic mail message in [a] *said first* memory if said source client does not properly respond to said request to complete a registration process; *and* allowing said destination client to access said *first* memory to determine the content of said original electronic mail message.

18. The method for preventing the delivery of unwanted electronic mail messages according to claim 12, further including the step of:

automatically adding said electronic mail address of said source client to said accept list if said source client properly responds to said request to complete a registration process.

*19. The claim as recited in claim 1, further comprising comparing said electronic mail address of said source client to both an accept list and a reject list of electronic mail addresses.*

*20. The claim as recited in claim 1, further comprising sending said original electronic mail message to said destination client when said electronic mail address of said source client is on said accept list.*

*21. The claim as recited in claim 1, further comprising deleting said original electronic mail message, if said electronic mail address of said source client is on said reject list.*

*22. The claim as recited in claim 1, further comprising deleting said original electronic mail message from said first memory upon a preselected event.*

*23. The claim as recited in claim 1, wherein said preselected event is upon instruction from said destination client.*

*24. The claim as recited in claim 1, wherein said preselected event is when a predetermined period of time has lapsed without receiving a response to said request that said source client complete a registration process.*

*25. The claim as recited in claim 1, wherein said preselected event is exceeding a predetermined number of original electronic mail messages.*

*26. The claim as recited in claim 1, further comprising allowing said destination client to access said first memory to determine content of said original electronic mail message.*

*27. The claim as recited in claim 1, further comprising automatically adding said electronic mail address of said source client to said accept list if said source client properly responds to said request to complete a registration process.*

*28. The claim as recited in claim 1, further comprising adding said electronic mail address of said source client to said reject list.*

*29. The claim as recited in claim 12, further comprising deleting said original electronic mail message from said first memory upon a preselected event, wherein said preselected event is upon instruction from said destination client.*

*30. The claim as recited in claim 12, further comprising deleting said original electronic mail message from said first memory upon a preselected event, wherein said preselected event is exceeding a predetermined number of original electronic mail messages.*

*31. The claim as recited in claim 12, further comprising adding said electronic mail address of said source client to said reject list.*

*32. A method for preventing the delivery of unwanted electronic mail messages to a destination client, said method comprising the steps of:*

*receiving an original electronic mail message from a source client at a destination server, said original electronic mail message including an email address from said source client;*

*comparing said electronic mail address of said source client to at least one of an accept list or a reject list of electronic mail addresses;*

*holding said original electronic mail message in a first memory that is distinct from a second memory where deleted messages are stored if said electronic mail address of said source client is not on at least one of said accept list or said reject list;*

*sending a reply electronic mail message from said destination server to said source client requesting that said source client complete a registration process, if said electronic mail address of said source client is not on at least one of said accept list or said reject list;*

*said registration process includes a query that is designed to be answered by a human rather than a machine;*

*monitoring a response of said source client to said request to complete a registration process to determine whether said source client properly responds to said request;*

*sending said original electronic mail message from said destination server to said destination client if said source client properly responds to said request to complete a registration process; and*

*deleting said original electronic mail message from said first memory when a predetermined period of time has lapsed without receiving a response to said request that said source client complete a registration process.*

*33. The claim as recited in claim 32, further comprising comparing said electronic mail address of said source client to both an accept list and a reject list of electronic mail addresses.*

*34. The claim as recited in claim 32, further comprising sending said original electronic mail message to said destination client when said electronic mail address of said source client is on said accept list.*

*35. The claim as recited in claim 32, further comprising deleting said original electronic mail message, if said electronic mail address of said source client is on said reject list.*

*36. The claim as recited in claim 32, further comprising deleting said original electronic mail message from said first memory upon a preselected event, wherein said preselected event is upon instruction from said destination client.*

*37. The claim as recited in claim 32, further comprising deleting said original electronic mail message from said first memory upon a preselected event, wherein said preselected event is exceeding a predetermined number of original electronic mail messages.*

*38. The claim as recited in claim 32, further comprising allowing said destination client to access said first memory to determine content of said original electronic mail message.*

*39. The claim as recited in claim 32, further comprising automatically adding said electronic mail address of said source client to said accept list if said source client properly responds to said request to complete a registration process.*

*40. The claim as recited in claim 32, further comprising adding said electronic mail address of said source client to said reject list.*

*41. A method for preventing the delivery of unwanted electronic mail messages to a destination client, said method comprising the steps of:*

*receiving an original electronic mail message from a source client at a destination server, said original electronic mail message including an email address for said source client;*

*comparing said electronic mail address of said source client to at least one of an accept list or a reject list of electronic mail addresses;*

*holding said original electronic mail message in a first memory that is distinct from a second memory where deleted messages are stored if said electronic mail address of said source client is not on at least one of said accept list or said reject list;*

*allowing said destination client to access said first memory to determine content of said original electronic mail message;*

*sending a reply electronic mail message from said destination server to said source client requesting that said source client complete a registration process, if said electronic mail address of said source client is not on at least one of said accept list or said reject list;*

*said registration process includes a query that is designed to be answered by a human rather than a machine;*

*monitoring a response of said source client to said request to complete a registration process to determine whether said source client properly responds to said request; and*

*sending said original electronic mail message from said destination server to said destination client if said source client properly responds to said request to complete a registration process.*

*42. The claim as recited in claim 41, further comprising comparing said electronic mail address of said source client to both an accept list and a reject list of electronic mail addresses.*

*43. The claim as recited in claim 41, further comprising sending said original electronic mail message to said destination client when said electronic mail address of said source client is on said accept list.*

*44. The claim as recited in claim 41, further comprising deleting said original electronic mail message, if said electronic mail address of said source client is on said reject list.*

*45. The claim as recited in claim 41, further comprising deleting said original electronic mail message from said first memory upon a preselected event.*

*46. The claim as recited in claim 41, wherein said preselected event is upon instruction from said destination client.*

*47. The claim as recited in claim 41, wherein said preselected event is when a predetermined period of time has lapsed without receiving a response to said request that said source client complete a registration process.*

*48. The claim as recited in claim 41, wherein said preselected event is exceeding a predetermined number of original electronic mail messages.*

*49. The claim as recited in claim 41, further comprising automatically adding said electronic mail address of said source client to said accept list if said source client properly responds to said request to complete a registration process.*

*50. The claim as recited in claim 41, further comprising adding said electronic mail address of said source client to said reject list.*

* * * * *